(No Model.)  5 Sheets—Sheet 1.

C. C. PARKER.
APPARATUS FOR CONTROLLING ADMISSION OF AIR TO FURNACES.

No. 575,849. Patented Jan. 26, 1897.

-WITNESSES-
Dan'l Fisher
Harry Constantine

-INVENTOR-
Charles C. Parker
by Geo. W. T. Arnaud,
Atty.

(No Model.) 5 Sheets—Sheet 2.

C. C. PARKER.
APPARATUS FOR CONTROLLING ADMISSION OF AIR TO FURNACES.

No. 575,849. Patented Jan. 26, 1897.

—WITNESSES—
Dan'l Fisher
Harry Constantine

—INVENTOR—
Charles C. Parker,
by Geo. H. I. Himard,
atty.

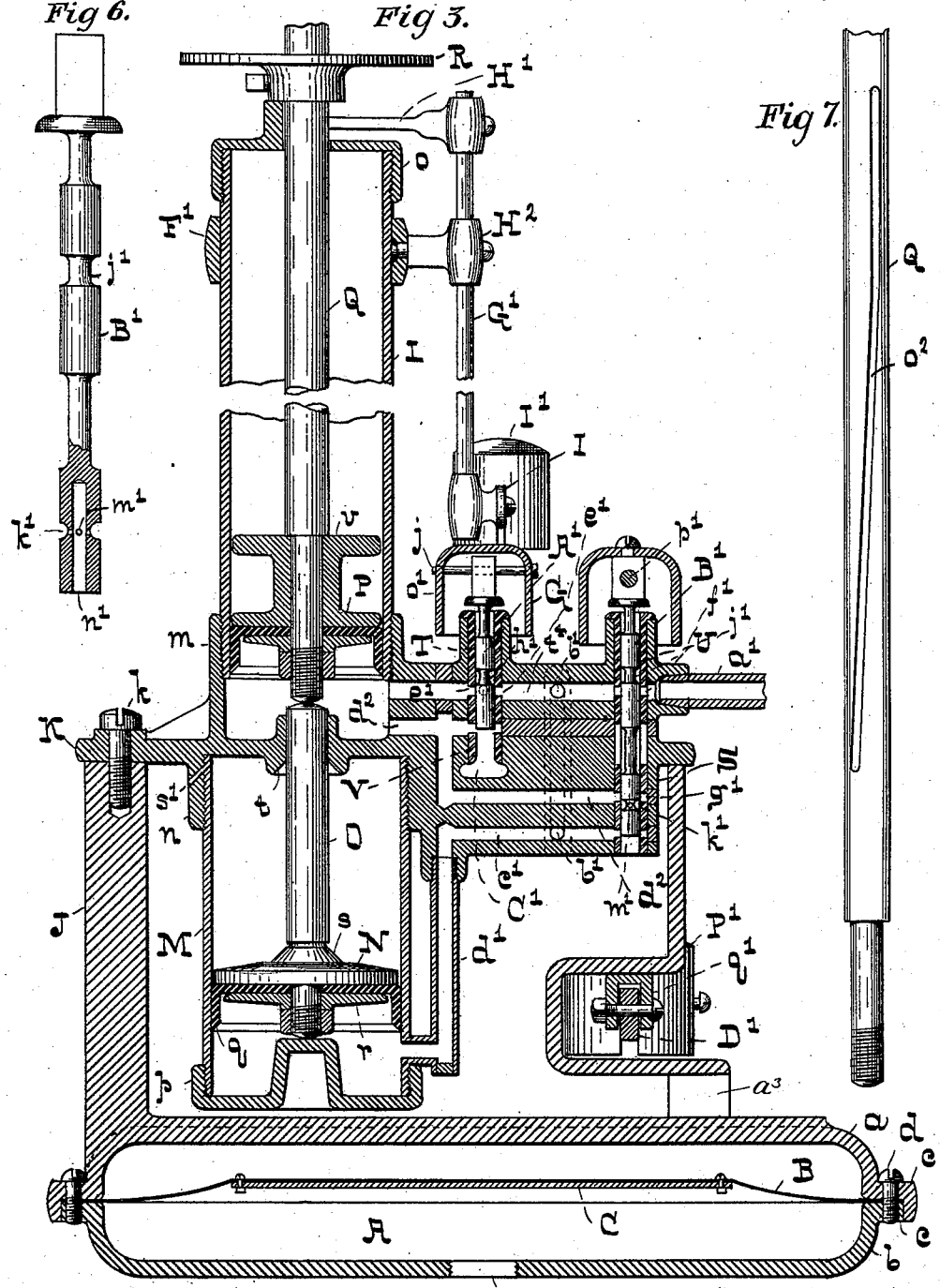

(No Model.)
5 Sheets—Sheet 4.
C. C. PARKER.
APPARATUS FOR CONTROLLING ADMISSION OF AIR TO FURNACES.
No. 575,849.
Patented Jan. 26, 1897.
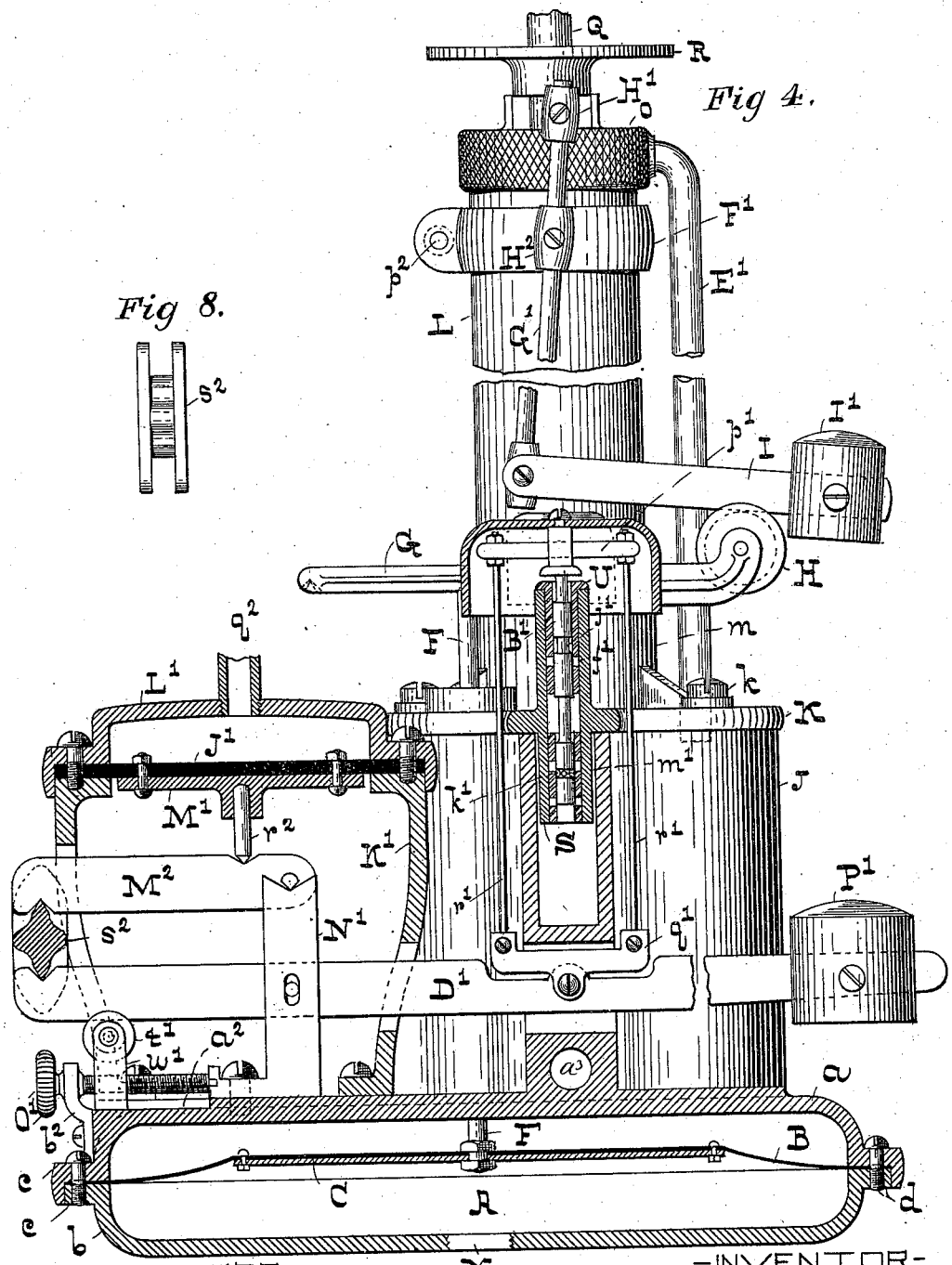
WITNESSES
Dan'l Fisher
Harry Constantine
INVENTOR
Charles C. Parker,
by Geo. W. T. Howard,
atty.

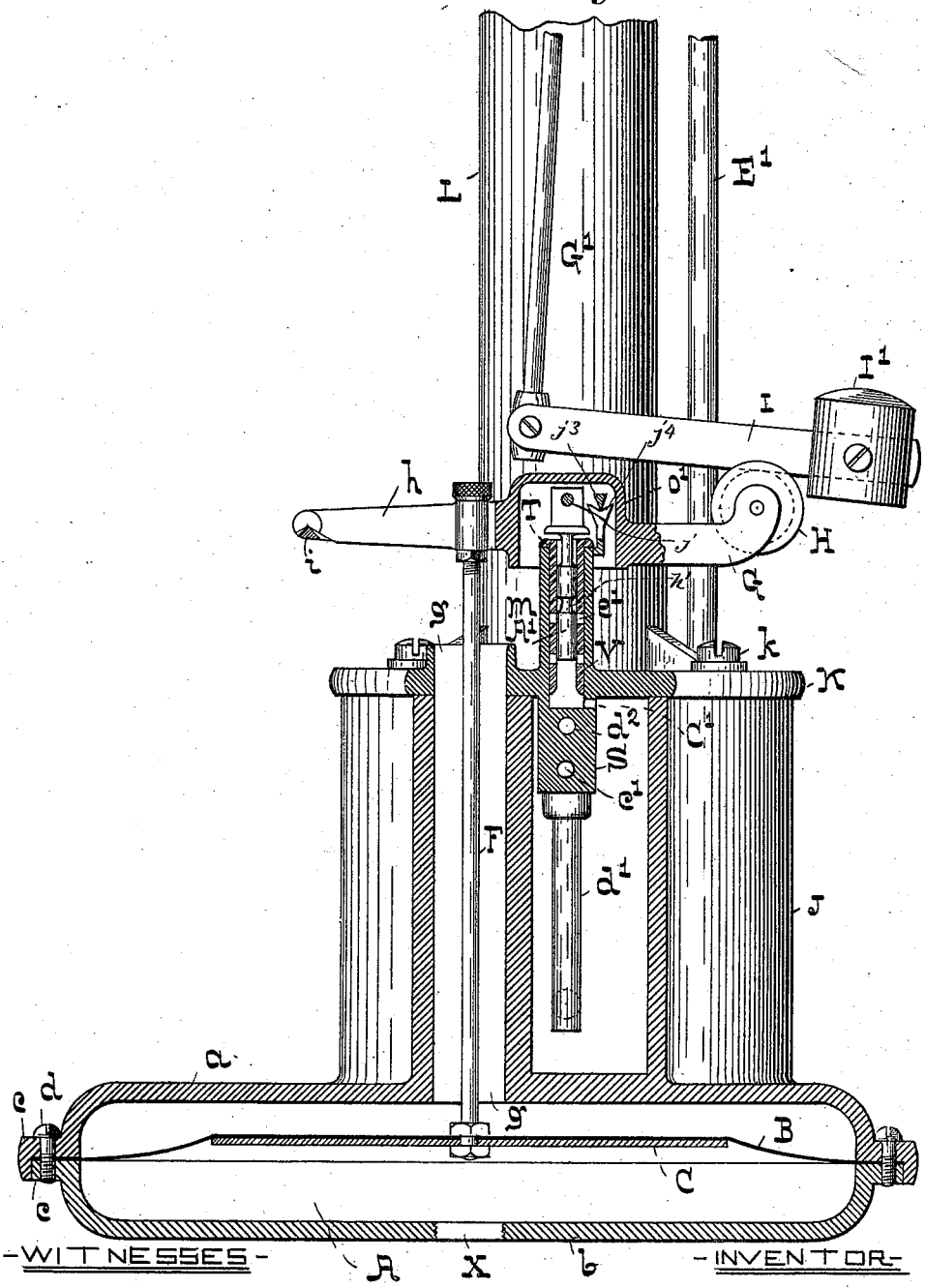

UNITED STATES PATENT OFFICE.

CHARLES C. PARKER, OF BALTIMORE, MARYLAND, ASSIGNOR OF THREE-FOURTHS TO JOHN A. DUSHANE, OF SAME PLACE.

APPARATUS FOR CONTROLLING ADMISSION OF AIR TO FURNACES.

SPECIFICATION forming part of Letters Patent No. 575,849, dated January 26, 1897.

Application filed August 14, 1895. Serial No. 559,284. (No model.)

*To all whom it may concern:*

Be it known that I, CHARLES C. PARKER, of the city of Baltimore and State of Maryland, have invented certain Improvements in Apparatus for Controlling the Admission of Air to Furnaces, of which the following is a specification.

This invention relates to certain improvements in that class of inventions whereby the admission of air to the furnace of a boiler is controlled, primarily, by means of a flexible diaphragm, one side of which is exposed to the gases in the furnace and the other to the atmosphere, as will hereinafter fully appear.

In the description of the said invention which follows reference is made to the accompanying drawings, forming a part hereof, in which—

Figure 1:
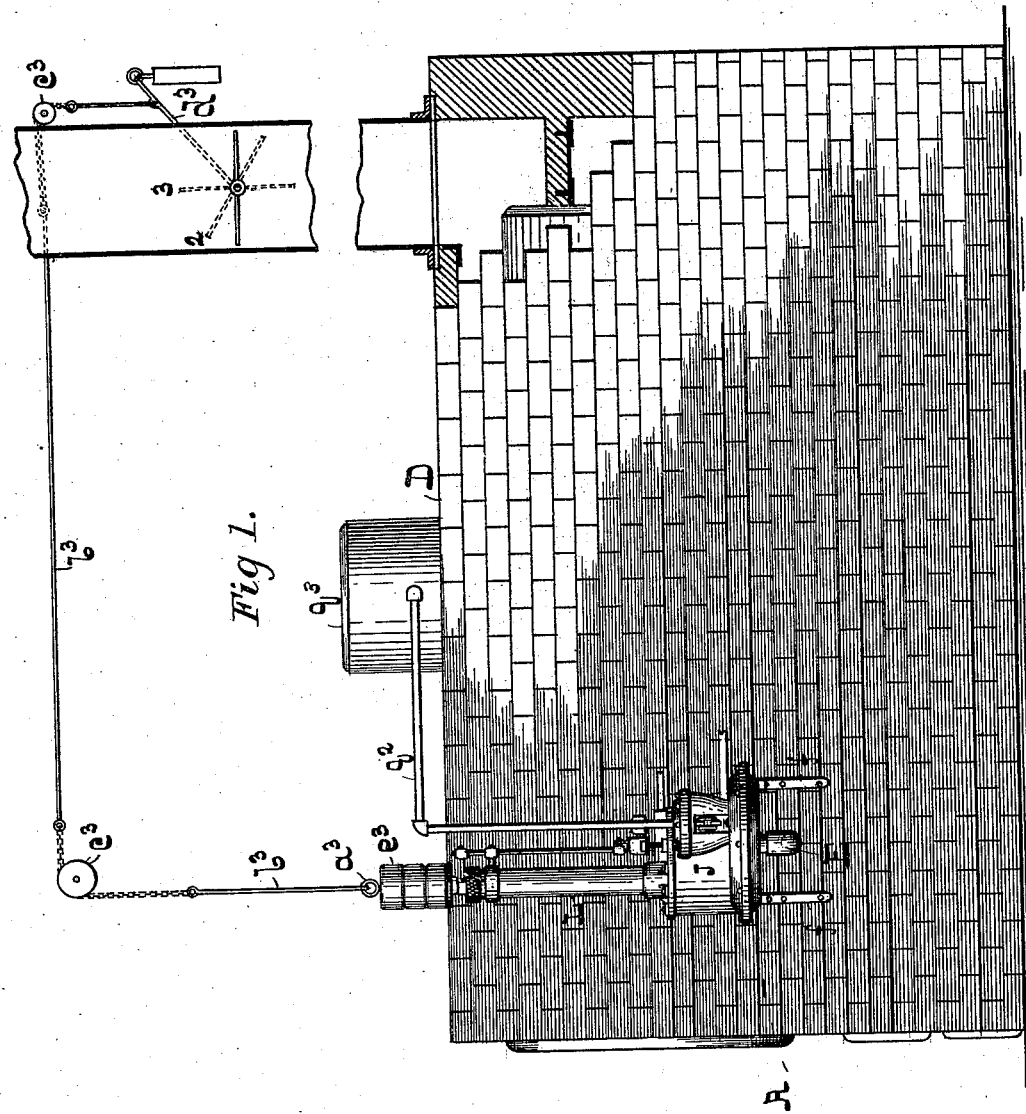
Figure 2:
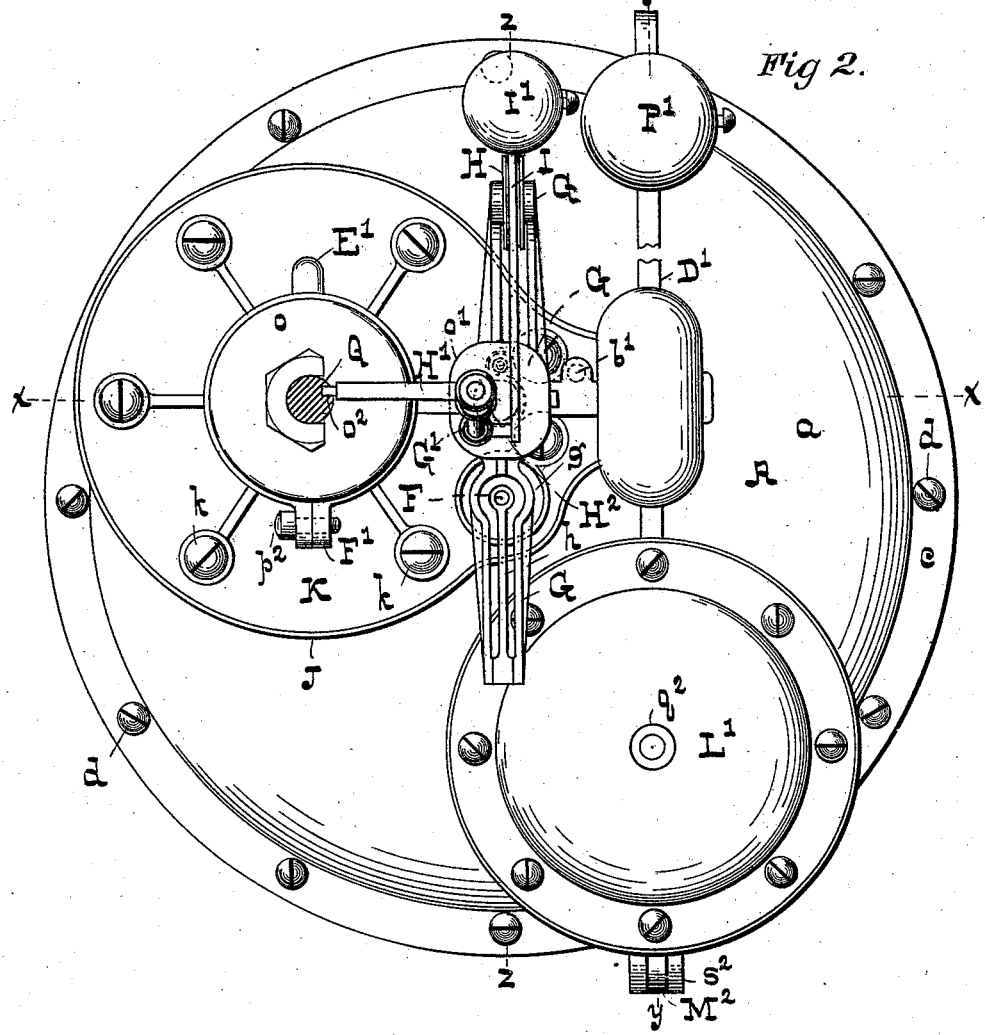

Figure 1 is a view of the improved apparatus applied to the furnace of a boiler. Fig. 2 is an enlarged plan of the invention alone. Fig. 3 is a vertical section of Fig. 2, taken on the dotted line $x\ x$. Fig. 4 is a vertical section of Fig. 2, taken on the dotted line $y\ y$. Fig. 5 is a vertical section of Fig. 2, taken on the dotted line $z\ z$. Figs. 6, 7, and 8 are details of the apparatus hereinafter described.

Referring now to the drawings, A is a circular box in two parts or sections $a$ and $b$, connected by flanges $c$ and bolts $d$.

B is a diaphragm formed, preferably, of sheet-rubber, held within the box A by means of the flanges $c$ and bolts $d$.

C is a metal plate secured to the diaphragm B in any suitable manner. This plate has a diameter considerably less than that of the interior of the box A, as shown.

The box A serves as the base of the machine, and is shown in Fig. 1 as supported from the brickwork D of the furnace by means of brackets $f$.

E is a pipe (shown only in Fig. 1) leading from the section $b$ of the box A through the brickwork D to the interior of the furnace. The under side of the diaphragm is therefore exposed to the gases in the furnace. The hole X in the section $b$ of the box A, into which the pipe E is screwed, is shown in Figs. 3, 4, and 5.

The top surface of the diaphragm B is exposed to the air which enters through a hole $g$ in the top section of the box A. (See Figs. 2 and 5.)

F is a stem attached to the diaphragm B, (see Figs. 4 and 5,) leading upward through the hole $g$ and secured to an arm $h$. (See Figs. 2 and 5.) The outer end of the arm $h$ rests on a knife-edge $i$ on the end of a branched lever G, fulcrumed at $j$ to a valve hereinafter described. The inner end of the said lever carries a roller H, which supports a compensating lever I, hereinafter described.

J is a waste-water receptacle formed as part of the section $a$ of the box A, provided with a discharge-aperture $a^3$ (shown in Figs. 3 and 4) of such capacity as to prevent the receptacle at any time being filled.

K is the covering-plate of the waste-water receptacle, held in place by the tap-screws $k$. (See Fig. 3, in which the plate is shown in section.)

L and M are cylinders, the former screwed into a base-ring $m$ on the upper side of the covering-plate K and the latter screwed into a similar ring $n$ on the under side of the said covering-plate. The cylinder L has a bonnet $o$, and the one M a similar bonnet $p$, the latter being water-tight.

N is a piston in the cylinder M, packed with an ordinary cup-leather $q$ and having a follower-plate $r$ and a nut.

O is a piston-rod extending from the piston N through the covering-plate K into the upper cylinder L. The base of the piston-rod has a conical surface $s$, adapted to make a joint with a conical face $t$ on the under side of the covering-plate K when the piston is at its highest point. (See Fig. 3.)

P is a piston in the cylinder L, packed with a cup-leather and provided with a plate and nut in a similar manner to the piston N in the cylinder M. This latter piston has a guiding-flange $v$ to steady it in its cylinder.

Q is the piston-rod of the piston P, and it extends through the bonnet $o$, and it is provided with a weight-holding plate R.

S is the valve-chest, formed as a part of the covering-plate. Within the chest S is the main waterway $t^4$, to which is connected the pipe $a'$, leading to some source of water-supply under pressure. The waterway extends to the cylinder L and has a branch $b'$, which connects it with the secondary waterway $c'$, having a pipe $d'$ in communication with the interior of the cylinder M.

T and U are bushings, the former extending from the top of the chest to a discharge-passage $d^2$, hereinafter described, and the latter entirely through the chest. The bushing T has ports $e'$, which form a part of the waterway $t^4$, and the bushing U has ports $f'$ corresponding in position with the ones $e'$ in the bushing T. The discharge-passage $d^2$ leads from the cylinder L to ports $g'$ in the bushing U.

V is a short bushing below the one T, forming a continuation of it. It begins at the discharge-port $d^2$.

A' and B' are balanced cylindrical valves in the bushings T and U. They have collars on their upper ends which rest on the ends of the bushings when the valves are entirely down. The valve A' has a groove $h'$, which, when in alinement with the waterway $t^4$, allows the entrance of water to the cylinder L. The lower end of the valve A' controls the discharge from the cylinder L to the outlet-opening C', which leads laterally to the waste-water receptacle J. (See Fig. 5.) The valve B' (shown on an enlarged scale in Fig. 6) has grooves $j'$ and $k'$, the former of which allows of the entrance of water to the main waterway $t^4$, and the latter, in connection with holes $m'$ and $n'$, admits of the discharge of water from the cylinder L. The lower end of the valve B' when raised opens the port $c'$, leading to the cylinder M, so as to discharge water therefrom.

The valve A' is pivoted by means of a pin $j$ to the lever G within a hood $o'$, which constitutes a part of the same. The knife-edged pin $j^3$, which constitutes a part of the hood $o'$, and which bears on the extension $j^4$ of the chest S, forms the fulcrum of the lever G. (See Fig. 5.)

The valve B' is united by the cross-bars $p'$ and $q'$ and the rods $r'$ to the lever D', hereinafter described.

Referring now to Fig. 3, it will be seen that there is an escape-opening $s'$ for any water which may pass from the upper cylinder L around the piston-rod O to the lower cylinder or around the cup-leather of the piston N of the cylinder M. This water is discharged only when the piston N rises to the top of the cylinder M.

E' is a pipe leading from the upper end of the cylinder L to the waste-water receptacle J to discharge water leaking past the piston P and carried up therewith.

Referring now to Figs. 2 and 7, it will be seen that the piston-rod Q has a longitudinally-extending groove or way $o^2$, the upper part of which is parallel with the axis of the rod and the remaining portion angular therewith.

F' is an open band secured around the cylinder L by means of a screw $p^2$.

G' is a rod connecting the lever I, before alluded to, to an arm H', the end of which rests in the groove or way $o^2$. (See Fig. 2.) This rod passes through a guide $H^2$, pivoted to the band F'. (See Figs. 3 and 4.) The lever I has a weight I', held in place by means of a set-screw.

J' is a second diaphragm, of rubber, forming a part of the pressure-regulating portion of the apparatus. This diaphragm, which is of heavy material, is supported by the hollow base K' from the section $a$ of the box A. The diaphragm J' is covered by a dished plate L', having a pipe $q^2$ leading to the steam-space of the boiler, which is represented by $q^3$.

M' is a plate secured to the under side of the diaphragm J', carrying a stem $r^2$ with a pointed end.

The lever D', before referred to, passes through the hollow base K', and is connected by the knife-edged link $s^2$ to the primary lever $M^2$, having its fulcrum on the stand N', erected on the box A. An edge view of the knife-edged link $s^2$ is shown in Fig. 8. The fulcrum of the secondary lever D' consists of a roller $t'$ on a nut $u'$, adapted to slide in a groove $a^2$ in the upper surface of the box A. (See Fig. 4.)

O' is an adjusting-screw for the nut $u'$, supported by the bracket $b^2$ and the foot of the stand N'. The screw O' is devoid of endwise movement.

The adjustment of the fulcrum of the secondary lever has the same effect as the adjustment of the weight P' at the end of the lever.

At the upper end of the piston-rod Q is an eye $a^3$, to which a link and chain $b^3$ (see Fig. 1) is attached. This chain passes over sheaves $c^3$, and is secured to the weighted damper-lever $d^3$.

The weights on the weight-supporting plate R are denoted in Fig. 1 by $e^3$.

Supposing that the boiler is cold and fire to be started, it is necessary that the chimney-damper should be wide open to give the proper draft. As there is at this time the same pressure above and below the diaphragm B, the said diaphragm has no tendency to fall and thereby admit water to underneath the pistons N and P and effect their rise and the consequent opening of the damper. The weight I' is therefore removed, so as to allow the diaphragm B to fall, and in the fall of the diaphragm the valve A' is opened and water admitted to the cylinder L and the piston P is raised to its highest position, which opens the chimney-damper. As the chimney becomes heated and the draft established the pressure under or below the diaphragm B is reduced sufficiently to keep the diaphragm down with the weight I' in position, and that weight is therefore replaced and the apparatus becomes self-adjusting.

The various parts of the apparatus are all illustrated in the relative positions which they occupy when steam in the boiler has reached the maximum height and the damper is tightly closed, as shown in full lines in Fig. 1.

Now supposing that the steam-pressure falls below the maximum point the first operation is the upward movement of the diaphragm J', owing to the pressure of steam thereon failing to overcome the influence of the weight P'. In the downward movement of the lever D' the valve B' is drawn down and the main waterway $t^4$ opened and the secondary waterway $c'$ and the discharge-passage closed. Water now passes through the branch $b'$, the secondary waterway $c'$, and the pipe $d'$ to the lower cylinder M and raises the piston N therein to its highest point. This elevation of the piston N and its rod O elevates the piston P and its rod Q, and the damper is placed in the secondary position, (shown by the dotted lines marked 2 in Fig. 1.) Upon the opening of the damper the pressure of the gases in the furnace is reduced and the diaphragm B is lowered by the superior pressure of the atmosphere. The lowering of the diaphragm B lowers the valve A' and thereby opens the waterway $t^4$ and closes the discharge-passage $d^2$, and water entering the cylinder L causes the piston therein to rise toward its highest point and the damper to approach its position of greatest opening, as shown by its broken delineation denoted by 3 in Fig. 1. Should the furnace-door be opened or bare spots or spaces be developed on the grate-bars, the pressure under the diaphragm B will be increased. The diaphragm being elevated by the increased pressure under it, the operation of the valve A', as before described, is reversed and the supply-water cut off from the cylinder L and the discharge opened. The piston P now falls to and rests upon the elevated piston-rod O and the damper is again brought to its secondary position, where it will remain until the door is closed.

It will be understood that the extreme movement of the damper above described does not necessarily take place when the door is closed, but the damper assumes a compromise position, or one which gives the proper draft in the chimney.

Supposing now that the steam-pressure should rise to the maximum point, the diaphragm J' is forced down, which overcomes the weight P', and the valve B' is raised, thus closing the main waterway $t^4$ against the entrance of water to the cylinder L and opening the secondary waterway $c'$ and the discharge-passage $d^2$. Upon the discharge of water from the cylinders L and M the piston P is forced down by the weights $e^3$, and in its descent the piston N is carried down and the water which formerly sustained it driven out through the pipe $d'$ and the secondary waterway $c'$ has been opened by the raising of the valve B'.

The maximum pressure-point may be raised or lowered by adjusting the position of the roller $t'$, which changes the fulcrum of the secondary lever D' through the agency of the threaded stem O'.

The weight of the diaphragm B is primarily counterbalanced by the weight I', but when the pressure of the gases in the furnace is reduced and the superior pressure of the atmosphere causes the diaphragm B to fall and the damper to be opened the elevation of the piston-rod and the lateral movement of the arm H', caused by its end following the angular slot in the piston-rod, serves to shorten the leverage of the weighted lever I, and the weight being practically increased the diaphragm is influenced to rise, and this influence counteracts to a certain extent the tendency of the diaphragm to fall by the attenuation of the furnace-gases. By this arrangement it will be understood that the operation of the diaphragm is modified at all times by the automatic adjustment of the lever I.

The length of the straight portion of the slot or way $o^2$ is equal to the stroke of the piston N, so that the adjustment of the lever I is only effected after the piston N has reached its highest position. In other words, no adjustment of the lever is required or effected in the operation of opening the damper to its secondary position.

From the foregoing description it will be understood that in the operation of the apparatus, when the steam-pressure is between the maximum and the minimum points, the movement of the piston P in a downward direction is limited by the piston-rod O. In other words, when the apparatus is controlling the admission of air to the furnace alone without reference to the steam-pressure the damper can never close entirely, but only to the second position; but upon the rise of the steam-pressure to the maximum point the supporting piston-rod O is withdrawn from the piston P and the damper is then entirely closed until the steam-pressure falls. It is impracticable to have a satisfactorily-operating steam-pressure regulator with a damper that does not close fully, and it is equally impracticable to carry out the controlling of the admission of air to the furnace in a proper manner if the damper can be entirely closed during the operation. It will therefore be understood that the apparatus provides for all contingencies, as the damper is closed entirely upon the steam rising to a predetermined pressure, and below that point or pressure the damper cannot be entirely closed.

I claim as my invention—

1. In an apparatus for controlling the admission of air to a boiler-furnace, a water-cylinder having a piston and rod, the latter indirectly connected to the chimney-damper, so as to operate it, a second water-cylinder underneath the first, having a piston and a rod which rod passes into the first cylinder and comes in contact with the piston or its rod therein, a chest having waterways and ports leading to the two cylinders, a valve whereby water is admitted to and discharged from the upper cylinder, a diaphragm one side of which is exposed to the gases in the furnace and the other to the atmosphere, with means to connect it to the said valve, a second valve or one to control the water-passages leading to and from the lower cylinder, a diaphragm operated by pressure in the boiler and means to connect it with the second valve, combined substantially as specified.

2. In an apparatus for controlling the admission of air to a furnace, a water-cylinder having a piston and rod, the latter indirectly connected to the chimney-damper so as to operate it, and provided with an inclined longitudinally-extending deflecting-surface, a chest and valve whereby water is admitted into and discharged from the cylinder, a diaphragm one side of which is exposed to the gases in the furnace and the other to the atmosphere, a stem leading from the said diaphragm, a lever which connects the said stem with the valve mechanism, a roller at the end of the lever, a weighted lever resting on the said roller, a stem pivoted to the cylinder, an arm at the upper end of the said stem, which engages with the inclined surface of the piston-rod, and at its lower end is pivoted to the weighted lever, so as to be deflected from its normal position in the rise and fall of the piston-rod, and thereby change the effective weight on the roller and alter the position of the controlling-valve, combined, substantially as specified.

3. In an apparatus for controlling the admission of air to a furnace, a water-cylinder having a piston therein whose rod is connected indirectly to the chimney-damper and whose full or complete stroke will entirely open or close the said damper, a second water-cylinder having a piston therein whose rod is adapted to enter the first cylinder and form a seat for the piston therein and which, when in such position, will reduce the stroke of the piston in the first cylinder to such an extent as to prevent the full closing of the damper, valve mechanism to admit water to the said cylinders to operate the pistons, and means to give movement to the said valve mechanism, combined substantially as specified.

4. In an apparatus for controlling the admission of air to a boiler-furnace, the combination of a water-cylinder having a piston and a rod which latter is indirectly connected to the chimney-damper so as to operate it, a second water-cylinder underneath the first having a piston and a rod which latter enters the first cylinder and serves as a sustaining device for the first piston, a diaphragm one side of which is exposed to the gases in the furnace and the other to the atmosphere, with valve mechanism operated from the said diaphragm to control the admission of and the discharge of water from the first cylinder, a second sustained diaphragm the unsustained side of which is exposed to the steam in the boiler, mechanism to connect the said diaphragm with valve mechanism so that upon the sustaining devices of the second diaphragm being overcome, water is allowed to escape from under both pistons and the first piston to have its full stroke and thereby entirely close the chimney-damper, substantially as specified.

CHARLES C. PARKER.

Witnesses:
WM. T. HOWARD,
DANL. FISHER.